United States Patent
Shulski et al.

(10) Patent No.: US 7,442,026 B2
(45) Date of Patent: Oct. 28, 2008

(54) APPARATUSES FOR PRODUCING ALTERNATIVELY SHAPED CONFECTIONARY PRODUCTS

(75) Inventors: Michael M. Shulski, Glenview, IL (US); Dennis Rybolt, Beecher, IL (US); Lindell Richey, Palatine, IL (US); Richard Flowers, Willow Springs, IL (US); Kevin Bernatz, Palos Heights, IL (US); Joseph Rancich, Park Ridge, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 657 days.

(21) Appl. No.: 10/924,157

(22) Filed: Aug. 23, 2004

(65) Prior Publication Data
US 2006/0040041 A1 Feb. 23, 2006

(51) Int. Cl.
A23G 3/12 (2006.01)
(52) U.S. Cl. ...................... 425/237; 425/236
(58) Field of Classification Search ............. 425/235, 425/237, 236
See application file for complete search history.

(56) References Cited

U.S. PATENT DOCUMENTS

| | | | | |
|---|---|---|---|---|
| 9,455 A | * | 12/1852 | Pond | 425/237 |
| 667,050 A | * | 1/1901 | Zwoyer | 425/237 |
| 1,771,982 A | * | 7/1930 | Mustin | 426/5 |
| 1,882,160 A | * | 10/1932 | Paris | 425/237 |
| 2,005,854 A | * | 6/1935 | Davis et al. | 425/237 |
| 2,484,670 A | * | 10/1949 | Barker | 425/237 |
| 2,958,902 A | * | 11/1960 | Decker et al. | 425/237 |
| 3,303,796 A | | 2/1967 | Novissimo | |
| 3,734,659 A | * | 5/1973 | Harris | 425/237 |
| 3,883,110 A | * | 5/1975 | Hendrickson et al. | 425/237 |
| 4,411,611 A | * | 10/1983 | Ohtawa et al. | 425/237 |
| 4,591,325 A | * | 5/1986 | Kollenz | 425/237 |
| 5,073,323 A | * | 12/1991 | McCartney | 425/237 |
| 5,342,188 A | * | 8/1994 | Zimmermann | 425/237 |
| 5,733,587 A | | 3/1998 | Ream et al. | |
| 6,635,292 B2 | | 10/2003 | Capodieci | |

FOREIGN PATENT DOCUMENTS

| | | | |
|---|---|---|---|
| JP | 61-184497 | * | 8/1986 |
| JP | 61-202665 | * | 9/1986 |
| JP | 2-63699 | * | 3/1990 |

* cited by examiner

*Primary Examiner*—James Mackey
(74) *Attorney, Agent, or Firm*—Bell, Boyd & Lloyd LLP

(57) ABSTRACT

Apparatuses and methods for improving the quality, diversity and productivity of confectionery product forming. The process includes using a set of rollers to define three-dimensional shapes in a sheet of confectionery product. The rollers each define a series of pockets that impart a force on the sheet and push the sheet inward at a multitude of points to form at least a portion of the final shape of the products. The confectionary sheet exiting the rollers includes an array of products separated by a thin web of confectionery material. The pockets and other apparatus are provided to help prevent the products from sticking to the pockets. The rollers also cut the sheet so that the sheet is of a size suitable to be placed in a separator or tumbler.

14 Claims, 14 Drawing Sheets

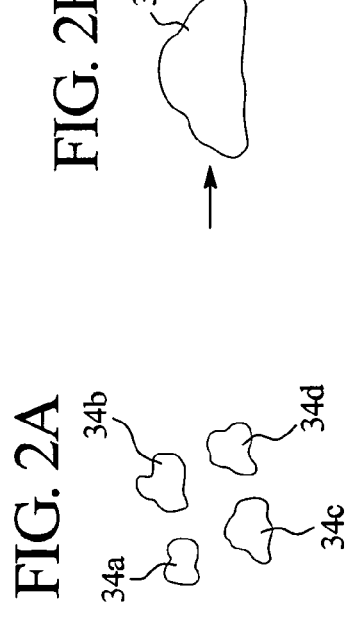
FIG. 2A
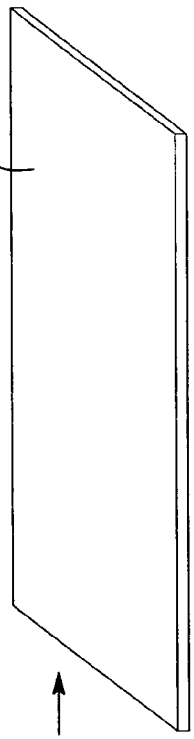
FIG. 2B
FIG. 2C
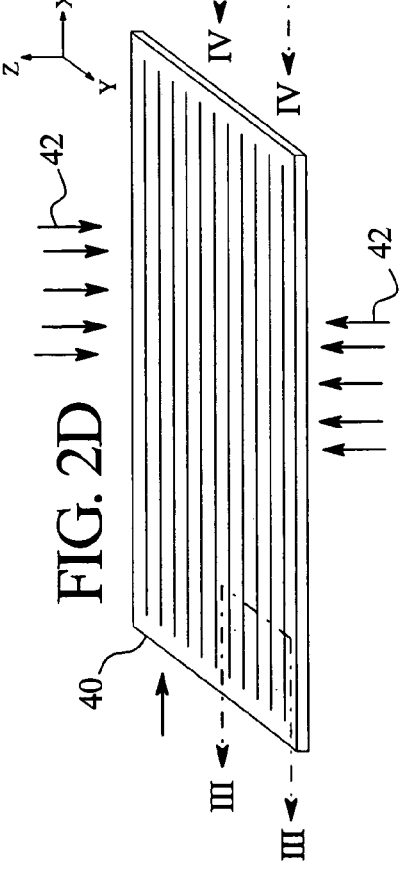
FIG. 2D
FIG. 2E
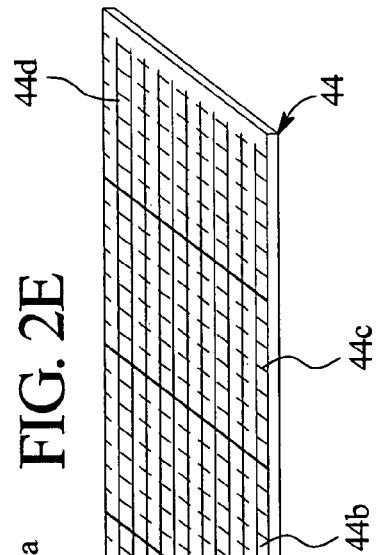
FIG. 2F
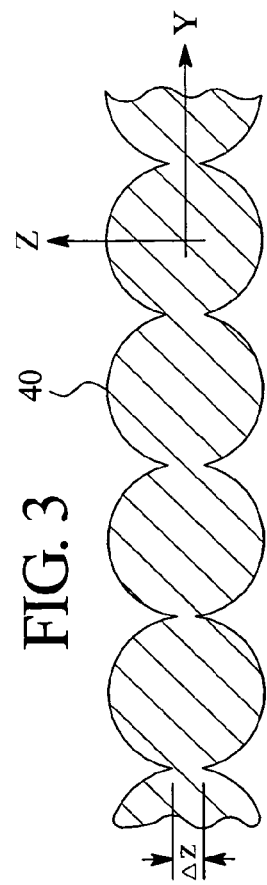
FIG. 3

APPARATUSES FOR PRODUCING ALTERNATIVELY SHAPED CONFECTIONARY PRODUCTS

BACKGROUND OF THE INVENTION

The present invention relates generally to the field of confectionary products. More specifically, the present invention relates to apparatuses and methods of making confectionary products.

Chewing gum products have been available for years. Typically, chewing gum comprises a water soluble portion and a water insoluble portion. As the chewing gum is chewed, flavor is released.

Chewing gum products have been shaped into various forms over the years. For example, bubble gum has been formed into shapes such as flat sticks, cylinders, cubes, cigars, shredded chew, and the like. Providing chewing gum, such as bubble gum, in novel shapes or forms can lead to enhanced marketability of such a product, particularly with younger consumers.

A need exists for equipment and processes that can produce a wide variety of shapes and patterns of chewing gums and other types of confectionary products.

A need also exists to produce confectionary product shapes more economically, more productively and with less operational deficiencies.

Further, since continually changing the size and shape of chewing gum and other confectionary products is desirable, equipment and processes are needed that can be adapted easily to form such products in novel sizes, shapes and forms.

SUMMARY OF THE INVENTION

The present invention provides apparatuses and methods for improving the quality, diversity and productivity of confectionery product forming. The process includes using a set of rollers to define three-dimensional shapes in a sheet of confectionery product. The rollers each define a series of pockets that impart a force on the sheet and compress the sheet at a multitude of points to form at least a portion of the final shape of the products. The confectionary sheet exiting the rollers includes an array of products separated in one embodiment by a thin web of confectionary material. The rollers also cut the sheet in one embodiment so that the sheet is of a size suitable to be placed in a separator or tumbler. The separator or tumbler breaks apart the individual products from the web and/or smoothes out any small deformities or extra material caused during the rolling operation.

In one alternative embodiment, the web is thin enough or non-existent so that the rollers cut separate and individual products, which can then be collected and conveyed to the tumbler for smoothing. In another alternative embodiment, the webbing is employed but the rollers do not cut the sheet into sheet sections. Instead the continuous sheet is fed directly into the separator or tumbler, which breaks apart the individual products and/or smoothes out the products.

The pockets of the rollers include a number of features that aid the confectionary mass in not sticking to the rollers. First, the pockets are flared or drafted so that a contact angle at the outer portion of the pockets produces less friction when the confectionary products are removed from the pockets than if the draft or taper is not provided. Second, an air dome is provided at the top and bottom, respectively, of the pockets of the top and bottom rollers. The air domes do not receive gum or confectionary product but instead form air pockets between the wall of the pockets and the product. The air pockets lessen the amount of contact surface between the confectionary products and the rollers. It is believed that the pockets also capture and hold air that is slightly compressed. Both the drafting and the air domes tend to help prevent the product sheet from sticking to the rollers when removed from same.

The configuration of the pockets in many instances is enough so that extra non-sticking agents and measures are not needed. Alternatively, such measures can be employed, such as cooling the confectionary mass and/or rollers, providing a rolling compound such as talc, maltitol, nubia oil and the like. In any case, the rollers increase the productivity of the forming operation with respect to stamping.

The present invention also includes multiple techniques for reducing or eliminating potential problems caused by rolling intricate three-dimensional shapes into gum or other confectionary products. For example, the rollers can elongate the sheeted product in the feed direction. To compensate for the elongation, the product-forming pockets are shortened along lengths running parallel and/or diagonal to the direction of travel of the sheet. The resulting product is elongated to the desired dimension. The pockets are also arranged in one embodiment to impart a net zero force to the product sheet in a direction transverse to the direction of travel of the sheet. Otherwise the rollers could tug the sheet one way or another off of or away from the conveyor. If it is not possible to structure the product-forming pockets to provide the net zero transverse force, separate force providing pockets are provided having shapes configured to yield the net zero force.

In one embodiment, a preformer is used to reduce product adhesion and also to help prevent potential problems caused by applying the rollers to the confectionary mass. The preformer scores the confectionary sheet in one direction to begin the process of forming the confectionary shapes. In essence, the preformer reduces the amount of work that the product-forming rollers have to do to produce the final product shapes. The preformer in one embodiment also employs a series of rollers that compress the confectionary mass along parallel tracks running in the same direction as the feed of the mass. It is possible, however, that preformer can also compress the confectionary products in a direction transverse or diagonal to the feed direction.

The rolling production of confectionary products is predicted to increase the production of three-dimensional confectionary shapes potentially on an order of magnitude with respect to the production rates of stamped confectionary shapes. It is also predicted that more intricate and diverse confectionary shapes can be made because the rolled confectionary mass is actively formed from two directions. Shapes of, e.g., bunnies, Santa Clauses, sports logos etc., can be made quickly and cost effectively using the apparatus and method of the present invention.

It is therefore an advantage of the present invention to provide improved confectionary products.

It is also an advantage of the present invention to provide a confectionary forming process that reduces sticking.

It is a further advantage of the present invention to provide a confectionary product forming process that enables more intricate and visually desirable confectionary products to be formed.

It is a yet another advantage of the present invention to overcome potential problems caused by the forces due to the interacting rollers of the present invention.

Still further, it is an advantage of the present invention to provide an apparatus that can be readily modified to produce different confectionary shapes at different times.

Moreover, it is an advantage of the present invention to provide a confectionary forming apparatus that can provide different shapes or different sizes of the same shape simultaneously.

Additional features and advantages of the present invention will be described in and apparent from the detailed description of the presently preferred embodiments and from the figures.

BRIEF DESCRIPTION OF THE FIGURES

FIGS. 2A to 2G illustrate various stages of the confectionery or gum product as it moves through the process of FIG. 1.

FIG. 3 is a cross-section of a portion of the sheet of confectionary product illustrated in FIG. 2D.

DETAILED DESCRIPTION OF THE INVENTION

The present invention includes apparatuses and methods for producing three-dimensional confectionary products and for increasing the productivity of manufacturing such products. As discussed above, current methods for producing three-dimensional confectionary product shapes include stamping such shapes into sheets of gum or confectionary products. Current rates for producing three-dimensional confectionary product shapes on a single line are, for example, in the range of 300 to 400 pieces per minute. The inventors of the present invention foresee an increase in shaped product output on a single line for a similarly sized machine to be increased to potentially an order of magnitude greater than current production. In accordance with one aspect of the present invention, the output increase may be achieved through the use of rollers to continuously form the three-dimensional shapes.

As highlighted below, the inventors have developed not only a system for shaping confectionary products via roll sets but also have developed a multitude of techniques for, among other items, (i) reducing the adherence between the confectionery products and the rollers, (ii) decreasing the amount of waste or scrap material caused by the forming process, (iii) producing unique and uniform confectionery products and (iv) reducing or eliminating other side effects of using rollers to form confectionery product shapes, particularly at high rates.

Process and Product

Figure 1:
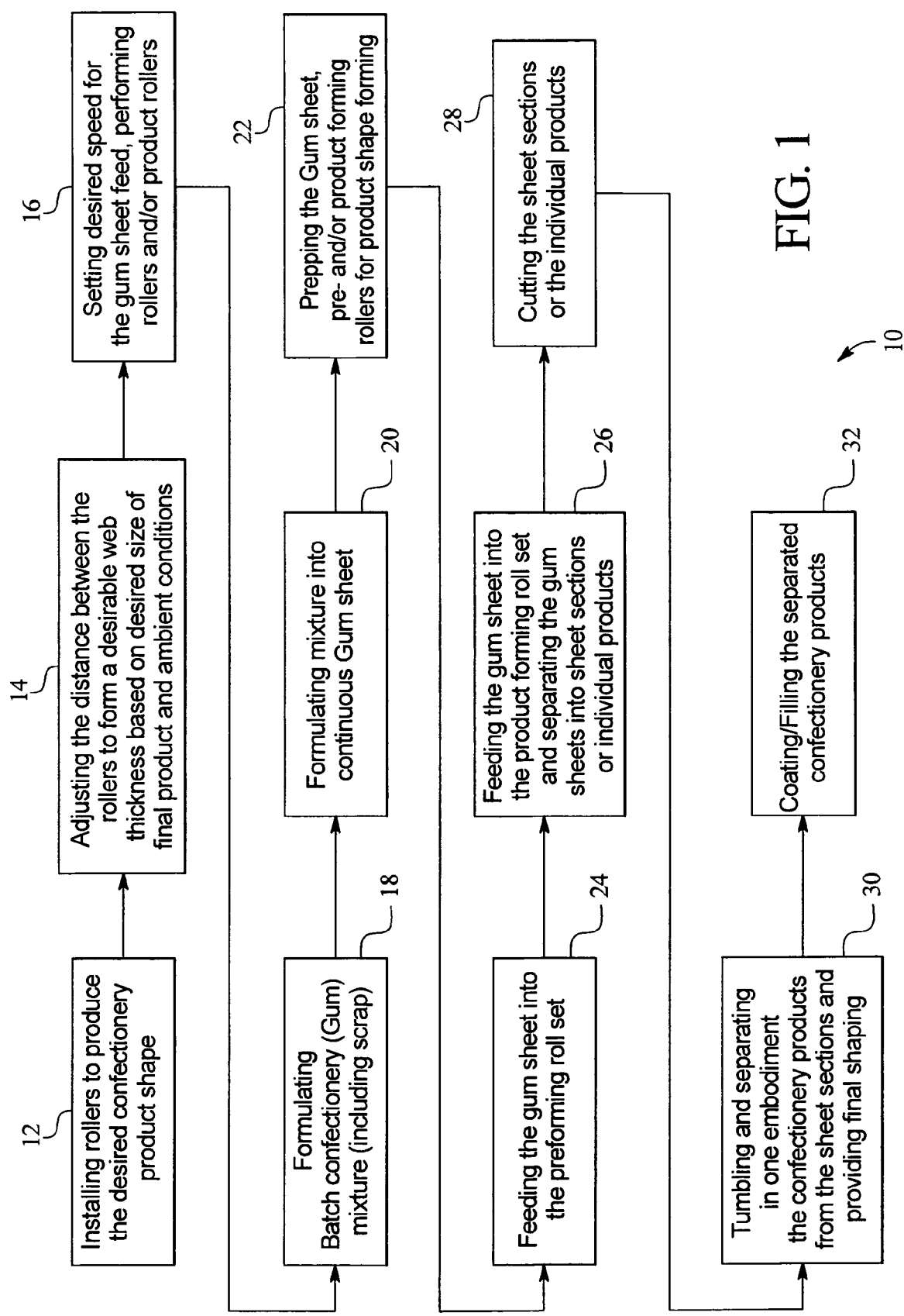
FIG. 1 is a process flow diagram of one embodiment of the method of forming the alternative confectionery shapes of the present invention.

Referring now to the drawings and in particular to FIG. 1, a process flow diagram illustrating some of the process steps and describing some of the apparatuses embodying the present invention is shown in process 10. Process 10 includes a number of optional steps that are identified as such in the following description. It should also be appreciated that the shaping of the product-forming pockets defined in the product-forming roll set (shown below) affects process 10. That is, the forming pockets are manipulated, configured and/or arranged to produce desired confectionary shapes. As discussed in more detail below, the manipulation, configuration and/or arrangement of the pockets aids in both reducing the amount of sticking between the confectionery products, such as gum, and the rollers and in the uniformity and exactness of the final confectionary product size and shape.

As seen in process step 12, the process is adaptable to accept different roll sets having different complimentary pairs of product-producing pockets that output different and desired confectionary product shapes. The roll sets illustrated below output square or hexagonal product-producing pockets. It should be appreciated that the apparatuses and methods of the present invention are adaptable to produce many different shapes in many different types of confectionery products and in particular have been found to be well suited for producing shapes in chewing gum. The installed rollers can produce the same shape or different shapes simultaneously. Further, the installed rollers can produce shapes having different sizes, curves and multiple three-dimensional facets. The shapes produced according to the present invention may be, for instance, symmetrical, non-symmetrical, flat on one or more sides, curved on one or more sides, contain indicia or markings on one or more sides, etc. The shapes can have any suitable number of sides, facets, angles and the like. Different shapes may be produced via the same set of rollers.

Step 14 of process 10 illustrates that one control parameter available to the operators of the present invention is the distance between the rollers of the roll set. That is, the roll set machine provides a manual or automatic adjustment mechanism (not illustrated) that enables the operator to set with high precision and accuracy the closest distance between the product-forming rollers of the roll set. In one preferred embodiment, the roll set machine provides a digital input device that enables the operator to set the gap between the product-forming rollers to within a specified tolerance. The machine includes a distance-measuring sensor and controller or programmable logic controller (not illustrated) that receives feedback from the sensor, which tells the controller how far apart the product-forming rollers are from one another. When the gap reaches the distance set by the operator, the movement of one or both of the rollers is stopped.

In one embodiment, the gap or distance between the product-forming rollers is set to be between .05 inch to .1 inch (1.27 mm to 2.54 mm), which forms a webbing that holds the at least substantially shaped products together for transportation to a tumbler. It is expressly contemplated to (i) provide a greater gap distance (than specified above) to form a thicker webbing, e.g., for larger confectionary products or for products having formulations requiring a thicker webbing. The present invention also includes (ii) setting the gap distance to be very small or virtually zero so that the webbing breaks apart allowing the products to separate after leaving the product forming rollers.

The product rollers can form or compress the product sheet in three dimensions. In accordance with one aspect of the present invention, the compressed product sheet is conveyed to a tumbler or other type of forming machine for final processing. To facilitate such movement, the compressed product shapes in one embodiment are held together by a web, the thickness of which is set by a gap between the rollers. When webbing is desired, and if the gap or thickness of the web is too small, the array or product sheet section can fall apart before the sheet section can be conveyed to the final forming device or tumbler. If the gap is too large, the product shapes in the tumbler will not separate properly from one another and/or from the web.

Other factors, such as the product formulation, the desired height of the product and environmental factors, may also affect the gap or web distance. The environmental or ambient factors, such as heat and humidity, may affect the confectionary forming operation and its output. The roller gap is adjustable to compensate for the ambient conditions. The gap is also adjusted to set the rollers apart a distance that will produce an overall desired product height. The gap or web distance is set through trial and error or is predetermined or preset.

As seen in step 16 of process 10, the speed at which the confectionery sheet is fed into the rollers and the speed of the rollers are adjustable. As discussed below, the process includes a preforming roll set in one embodiment. The speed of the preforming rollers can also be adjusted as desired. It is also possible to link the speed of one or more or all of the feed conveyor, preforming rollers and/or product-forming rollers so that if, for example, the speed of the feed conveyor is changed, the speed of the preforming and product-forming rollers is changed or follows accordingly. In that example, the speed of the feed conveyor is set to produce a desired output per minute and the rollers are adjusted and set automatically. Such following arrangement also enables the speed of the preforming and product-forming rollers to adjust automatically with minor fluctuations in conveyor speed. Minor speed fluctuations can occur due to ambient effects, machine wear and tear, and acceleration and deceleration of startup and shutdown, respectively.

In step 18, a batch of a confectionery mixture is formed. That mixture can include a certain amount of scrap or waste from (i) the product-forming roll operation and (ii) the separating or tumbling operation. Various formulations for the base and additives of a confectionery product, e.g., chewing gum, are illustrated below. Those formulations are merely illustrative of the types of confectionery products that can be formed using the apparatuses and methods of the present invention. The formulations listed are in no way meant to be limiting or inclusive.

In step 20 of process 10, the batch mixture is formed into a continuous confectionery or gum sheet. That process and the apparatus for producing the sheet are well known to those of skill in the art and do not need to be elaborated herein. It suffices to say that the sheet-forming mechanism can include a series of rollers that sequentially step the sheet down to a desired and continuous thickness. Alternatively, or additionally, one or more extruders may be used to produce the confectionary product sheet. A suitable thickness for the continuous confectionary product sheet of step 20 of process 10 of the present invention can be in the range of about ⅛ inch to about one inch (3.18 mm to 25.4 mm).

In optional step 22 of process 10, any one or all of the confectionary product sheet, preforming rollers and/or product-forming rollers can be prepped for the product-forming steps that are about to take place. In one embodiment, any one or more of the confectionary product sheet, preforming rollers and/or product-forming rollers can be chilled. Further, any one of those items can receive a rolling compound, such as talc, maltitol (sugar or alcohol), nubia oil or any combination thereof. The chilling and rolling compounds help prevent the confectionery product or gum sheet from sticking to the shape-forming rollers as the sheet enters and exits the rollers. While step 22 is illustrated as occurring before the preforming rolling step 24 of process 10, in an alternative embodiment the prepping step occurs after the preforming step. It is desirable to eliminate step 22 as much as possible.

Step 24 of process 10 includes preforming the confectionary product sheet before the confectionary product sheet is fed into the product-forming roll set. Steps 22 and 24 are both generally intended to prevent the confectionary product sheet from sticking to the product-forming rollers, which, as described above, compress the confectionary products very close to their final shapes. Depending on the final shape, the output, the formulation, ambient conditions and other factors, one or both of the steps 22 and 24 may be eliminated. In particular, it is desirable for cost purposes and other reasons not to chill the sheet or rollers or to use expensive or maintenance-producing lubricants or rolling compounds, such as nubia oil.

FIG. 3 illustrates a cross-section of a preformed shape 40 taken along line III-III of FIG. 2D. As illustrated, the sheet leaving the preforming roll set is not cut into sheet sections. That function, if performed at all, is performed by the product-forming rollers. In the preforming step, however, the sheet is scored or compressed along the product lines extending in the feed direction. If, for example, the ultimate shape of the product is a square shape, the preforming indents the sheet along the lines of the product squares that run in the same direction as the feed of the sheet. One purpose of preforming is to relieve some of the pressure and stress that would otherwise be placed on the confectionary product and product-forming rollers in the product-forming roll step.

The preforming step is also believed to help prevent the confectionary mass from adhering to the product-forming rollers. For one reason, preforming reduces the stress placed on the mass during the product forming step as just discussed. Preforming also sizes the rows or product array dimensions on the preformed sheet in one embodiment so that the product-forming rollers do not have to expand the confectionary mass in any direction to fill voids defined by the product-forming pockets of the product-forming rollers. Instead, the pockets push the mass down and out from beneath the pockets. It is believed that not having to expand or draw the mass into the pockets may reduce adhesion between the confectionary mass and the product-forming pockets of the product-forming rollers.

Process step 26 of process 10 involves feeding the confectionary product sheet into the product-forming roll set and separating the continuous confectionary product sheet into sheet sections having sizes suitable for placement in a separator or tumbler. The product-forming roller and the process of operating same is described in detail below in connection with FIGS. 7 to 11. As stated above, the product-forming rollers may be set closely enough to each other to produce no or very little webbing. In such case, individual confectionary products are separated from each other upon exiting the product-forming rollers.

The rollers in one embodiment each produce roughly half of the overall confectionary product shape. In alternative embodiments, the rollers can produce a disproportionate share of the overall shape. In the illustrated embodiments, the rollers each produce the same shape. It is expressly contemplated however that the pockets of the rollers can have the same outer shape or footprint and have different inner or well-shapes. For example, the final confectionary product shape can be that of an egg, where one roller produces the pointed side of the egg, while the other roller produces the blunt side of the egg. Alternatively, the rollers can each produce half the egg along an axial asymmetrical section.

As illustrated in more detail below, the shape-forming pockets in the rollers include or define air domes into which product does not extend or fill or extend or fill completely. Such domes reduce the amount of contact between the confectionery product and the rollers. Further, it is thought that the domes enable air trapped therein to become pressurized. Both those features aid in the ready release of the sheet sections from the rollers. As described further below, the dimensions of the pockets are manipulated to account for product elongation in the feed direction due to the cutting force of a cutting knife.

As illustrated below, one or both of the rollers includes a knife that follows the collective contour of a row or offset row of product-producing pockets. The knife cuts the continuous confectionery product sheet into sheet sections that are each have a feed direction dimension equal to the circumference of the knife. The sheet section includes an array of confectionery products that are held together by a confectionery product web having the desired width as discussed above. The sheet section is sized to be placed conveniently in a separator or tumbler.

In one alternative embodiment, the product-forming rollers do not provide the knife edges so that the continuous confectionary product sheet is not cut into sheet sections. A continuous confectionary product sheet is instead fed as such into the tumbler, which separates the continuous sheet into individual products and further forms such products. In a further alternative embodiment, the product-forming pockets of the product-forming rollers act as knives that separate the products, so that the products do not exit the rollers in a webbed sheet but instead exit as separate products.

As illustrated in connection with step 28 of process 10, sheet sections having the product shapes substantially formed thereon are cured before being separated into the final product shapes. The confectionery products if produced individually are also cured in one embodiment. The curing process in one embodiment includes heating the confectionery product to a desirable temperature. In one embodiment, the curing process toughens or hardens the confectionery products, e.g., via cross-linking of the confectionary material. Curing the products can be performed through the use of chemical additives, ultraviolet radiation and heat.

As illustrated in step 30 of process 10, the cured sheet section is sent to a separator or tumbler that (i) breaks the products from the web of the sheet section (ii) impacts or subjects the separated confectionery product pieces to forces that remove or eliminate excess material from the web and (iii) flattens areas needing flattening, e.g., slight domed areas on the tops and bottoms of the products due to the air domes of the shaped pockets formed on the product-forming rollers. In an alternative embodiment, when the products are separated upon exiting the product-forming rollers, the individual products are also conveyed to the tumbler, where steps (ii) and (iii) but not step (i) are performed. The products leaving the tumbler have the final desired confectionery shape, although, it is thought that certain products may be formed precisely enough upon exiting the product-forming rollers to forgo tumbling.

As seen in step 32 of process 10, the products are coated with any desired final coating, such as a hard coating. Various formulations for a hard coating are discussed below. Alternatively, the confectionery products can enclose a gel or otherwise soft filling which is also provided in connection with step 32. The products leaving step 32 of process 10 are ready for packaging.

Figure 2G:
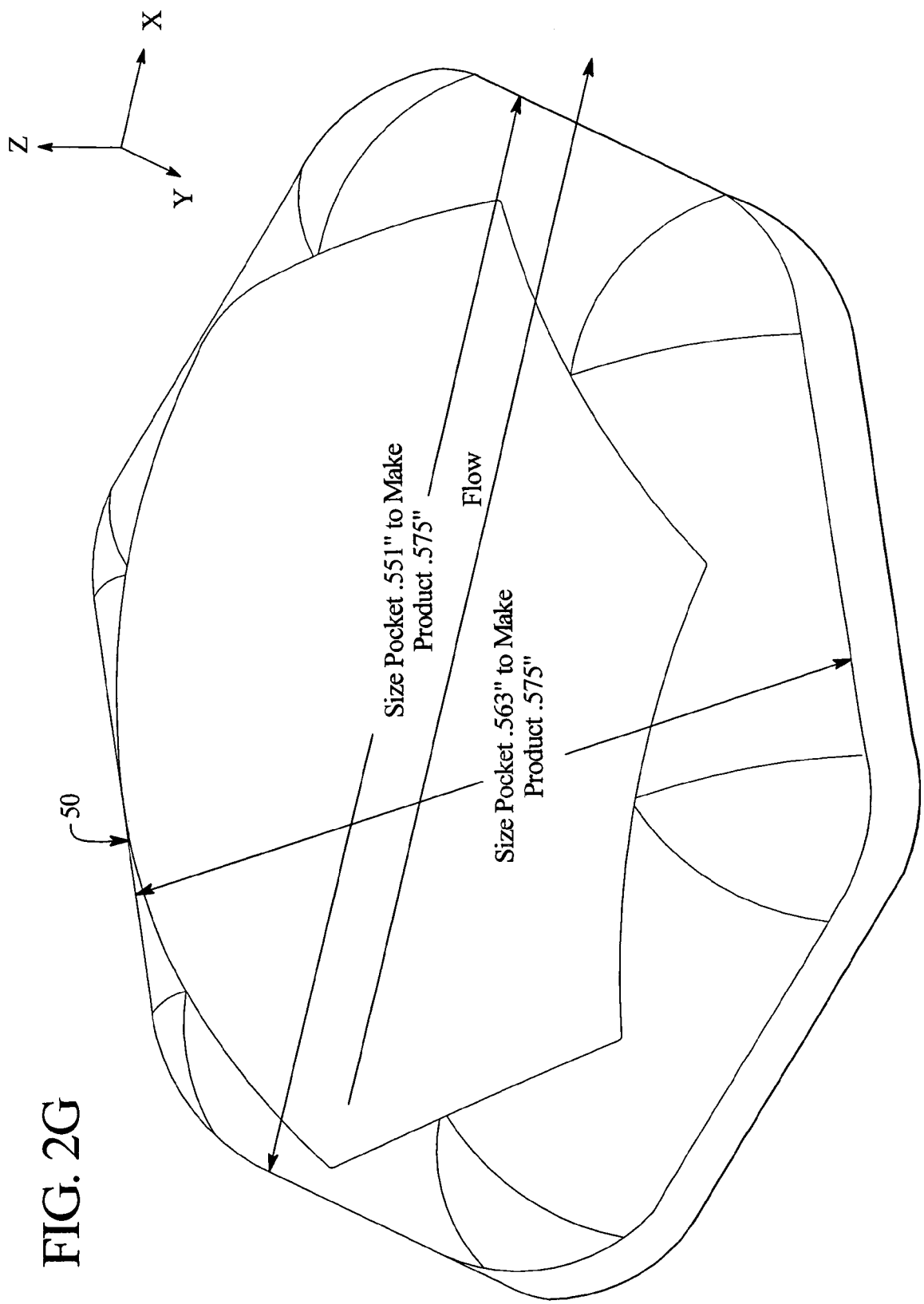

Referring now to FIGS. 2A to 2G, the confectionery, e.g., gum, product itself is illustrated as it proceeds through the steps 12 through 32 of process 10 of FIG. 1. FIG. 2A illustrates that ingredients 34a to 34d are combined to form a bulk confectionary product mass 36, illustrated in FIG. 2B. As set forth below, one preferred confectionery product of the present invention is gum. Gum generally includes base ingredients and additional flavoring ingredients. Certain implementations of those ingredients are discussed below. While gum is one possible product, other confectionery products are also suitable for use with the apparatuses and methods of the present invention, such as taffy, caramel, soft and/or chewy candy, soft and/or chewy confections or any other type of confectionary product formable during a plastic state. As used herein, "confectionary product(s)" refers to each of the above items.

FIG. 2C illustrates a continuous confectionery product sheet 38 formed from the confectionary product mass 36 via the apparatuses and methods discussed above. FIG. 2D illustrates a scored sheet 40, which is produced by running continuous sheet 38 through the preforming roll set as described above. FIG. 3 illustrates a cross-section of the scored sheet 40 showing that the confectionary product is beginning to take shape in at least one dimension, namely the Y dimension illustrated in FIGS. 2D and 3. That is, the overall size or distance in the Y direction or dimension has been set or substantially set. The length in the X direction has not yet been set. The height in the Z direction can also be further reduced if needed.

Figure 4A:
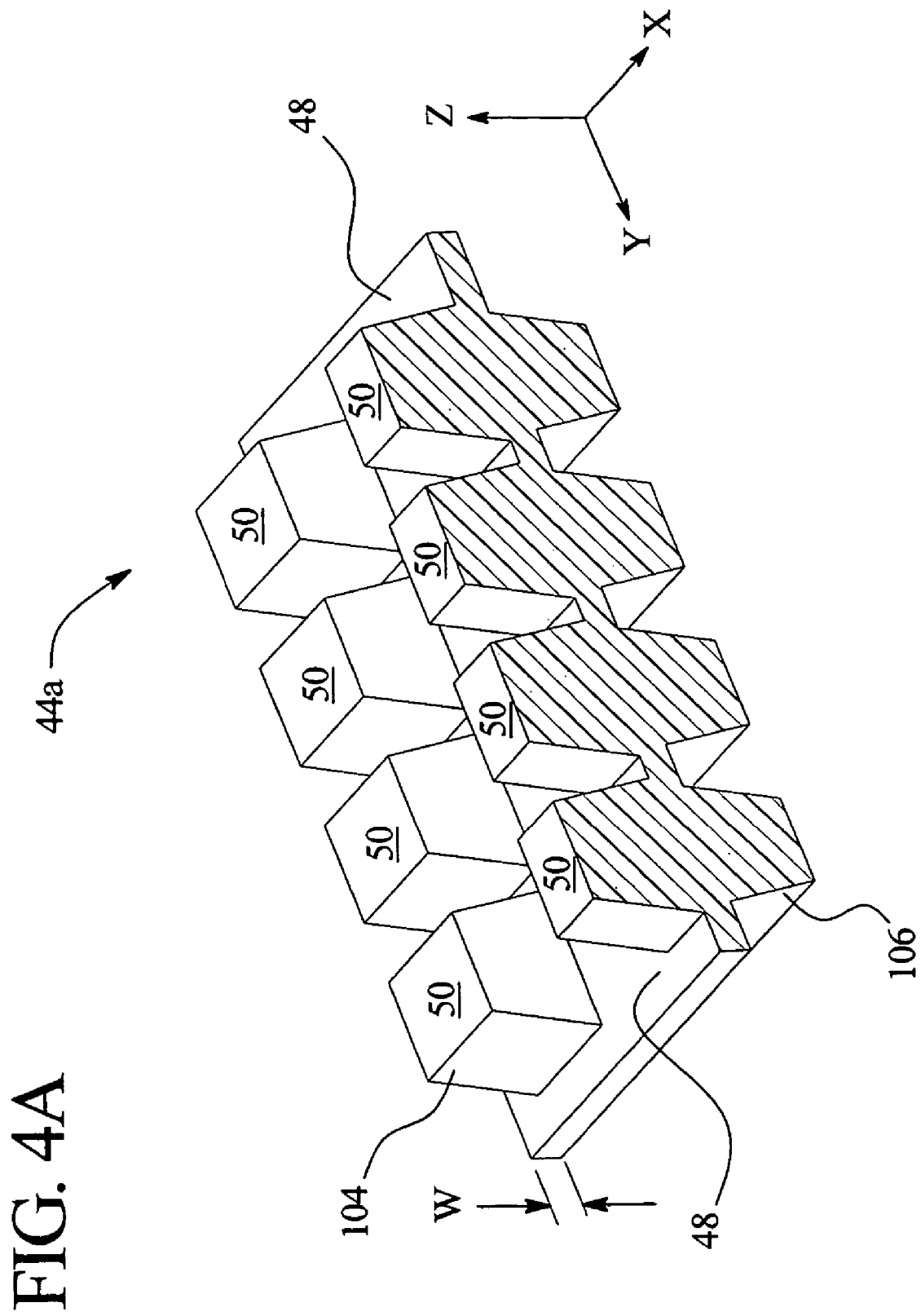
FIG. 4A is a cross-section of a portion of the confectionary product sheet section illustrated in FIG. 2E.

FIG. 2E illustrates a formed sheet 44 (referring collectively to sheet sections 44a to 44d, etc.), which is the scored sheet 40 of FIG. 2D after it has been run through the product-forming rollers. The product-forming rollers have compressed scored sheet 40 in the X, Y and Z directions, setting the size and shape of each of the end confectionary products in sheet 44. FIG. 4A illustrates a section of sheet 44a of sheet 44 taken along line IV-IV in FIG. 2E. For simplicity, the confectionary products 50 are shown in FIG. 4A (and FIG. 4B) having a square or rectangular top and bottom. FIG. 2G on the other hand illustrates one preferred shape for product 50 having a hexagonal top and bottom. It should be appreciated that the product rollers of the present invention can produce many different types of straight, angled or curved shapes as has already been discussed.

FIG. 2E illustrates that the product-forming rollers, in addition to setting the X, Y and Z dimensions of product 50 in sheet 44, has also scored or separated sheet 44 into separate sections 44a, 44b, 44c and 44d. The sheet sections are of a size that can be readily transported to and placed inside of a tumbler 46, shown figuratively in FIG. 2F. Alternatively, a suitable conveying apparatus is employed to feed sheet 44 directly into tumbler 46 without separating sheet 44 into separate sections 44a, 44b, 44c and 44d. Further alternatively, the product-forming rollers separate sheet 40 into the individual products 50, which are collected and transported to the tumbler 46 and fed into the tumbler as individual products and not in a sheet format.

FIG. 4A illustrates that a web 48 between the products 50 spans a height W that has been selected for the reasons discussed above. Width W of web 48 may be the same or different, e.g., smaller than the minimum height $\Delta Z$ of scored sheet 40 shown in FIG. 3. That is, the preforming step may produce a preformed sheet 40 where $\Delta Z$ is equal to W, in which case the product-forming rollers forming sheet sections 44a to 44d do not compress the scored sheet 40 along the score lines in the Z direction any further. Alternatively, the amount of compression taking place in the preforming step may yield a scored sheet 40 that is further compressed along the score lines in the product-forming step, which yields scored sheets 44a to 44d shown in FIG. 2E.

Figure 4B:
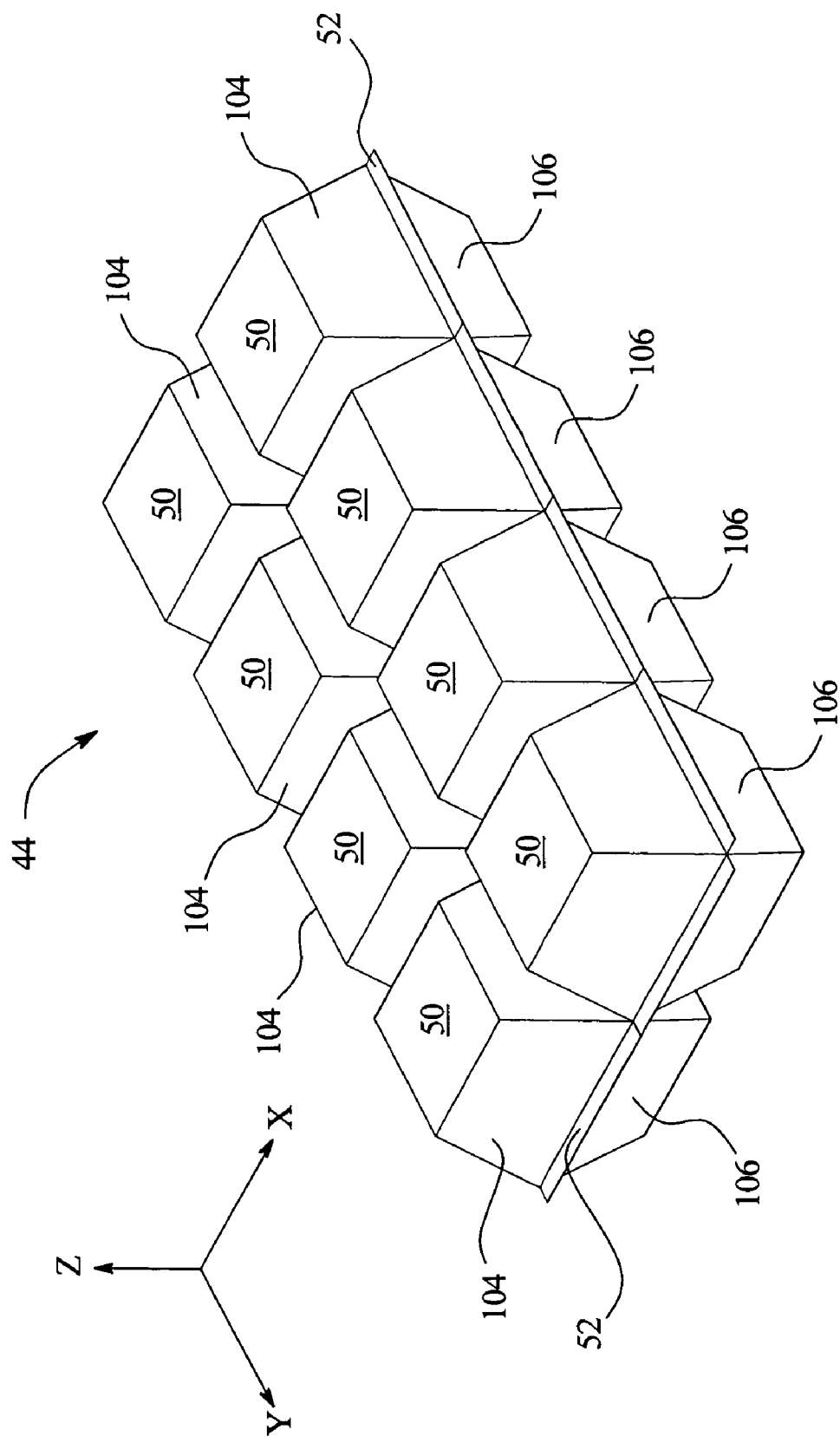
FIG. 4B illustrates the same confectionary products shown in FIG. 4A, which the product-forming rollers form individually instead of in a web as shown in FIG. 4A.

FIG. 4B illustrates the same products 50 illustrated in FIG. 4A. Here, the width W is zero or so small that products 50 fall free from each other upon exiting the product-forming rollers. Any webbing or flashing 52 that is formed via the product-forming rollers either (i) falls free from products 50 and is collected as scrap or (ii) remains with the products 50 and is removed or smoothed during tumbling. The individual products 50 exiting the product-forming rollers are collected in a bin or container and transported to tumbler 46 in one embodiment.

FIG. 2F illustrates that when one of the scored sheet sections 44a to 44d is placed inside tumbler 46, the forces created by the tumbler due to (i) the products 50 hitting one another and (ii) products 50 hitting the wall of tumbler 46 cause products 50 to break apart from web 48. The forces also eliminate the lines or extra material on products 50 produced by the breaking apart of products 50 from web 48, the drafting of the products and from extra material due the air domes described below. The products outputted from tumbler 46 are smooth and uniform, as shown by product 50 in FIG. 2G. The tumbling action also tends to round out sharp corners on products 50, resulting in esthetically pleasing final shapes.

Apparatus

Having described the process for forming the alternative confectionary product shapes of the present invention and illustrating the confectionery product from the ingredient stage through to the final product shape, this part of the detailed description focuses on the apparatus for performing parts of the above-described process. The text and drawings show how the apparatus increases productivity, reduces product adhesion, produces alternative confectionary shapes and ensures that the end product remains within desired size and shape tolerances.

Figure 5:
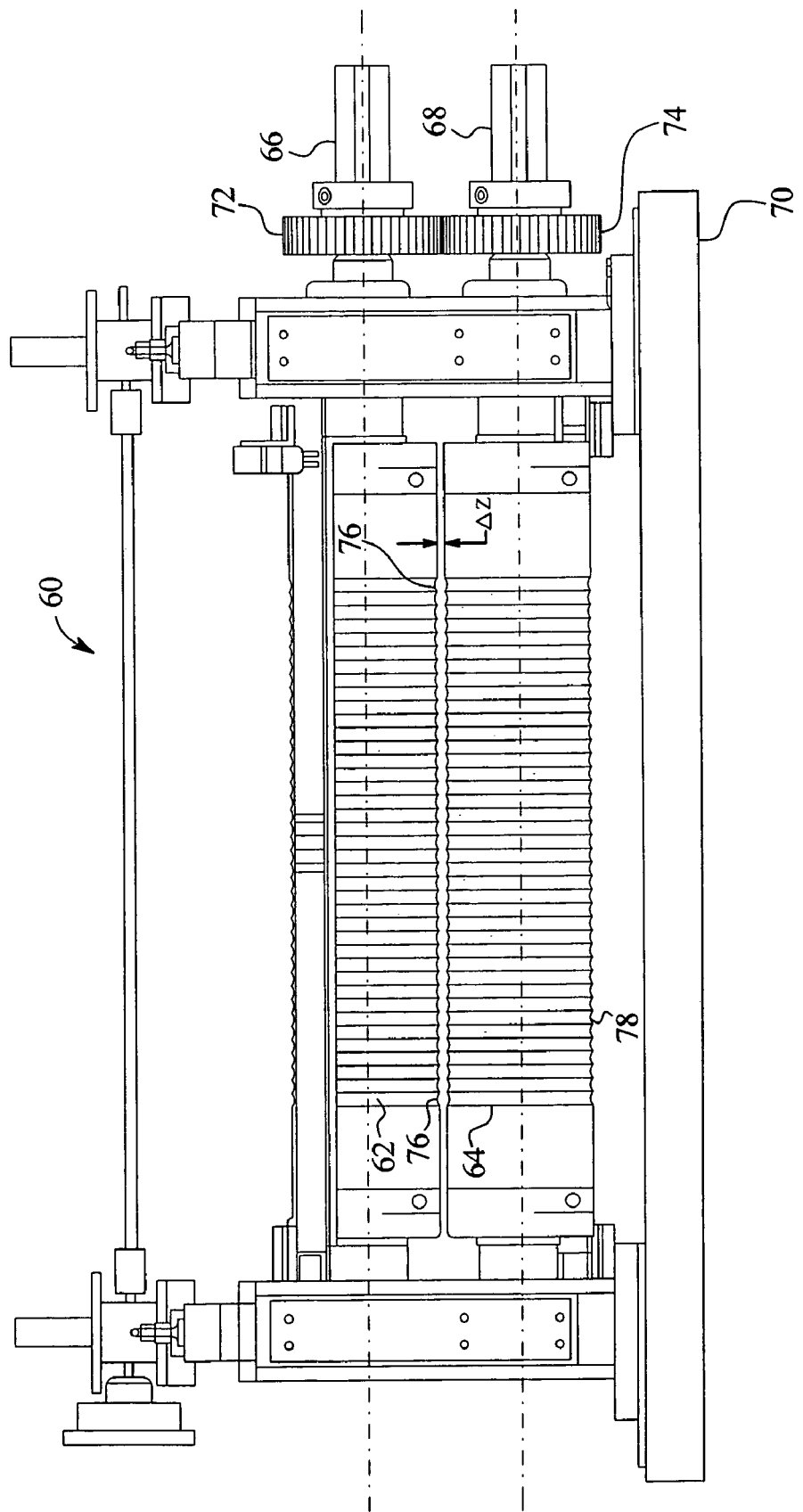
FIGS. 5 and 6 illustrate one embodiment of a preforming machine of the present invention.
Figure 6:
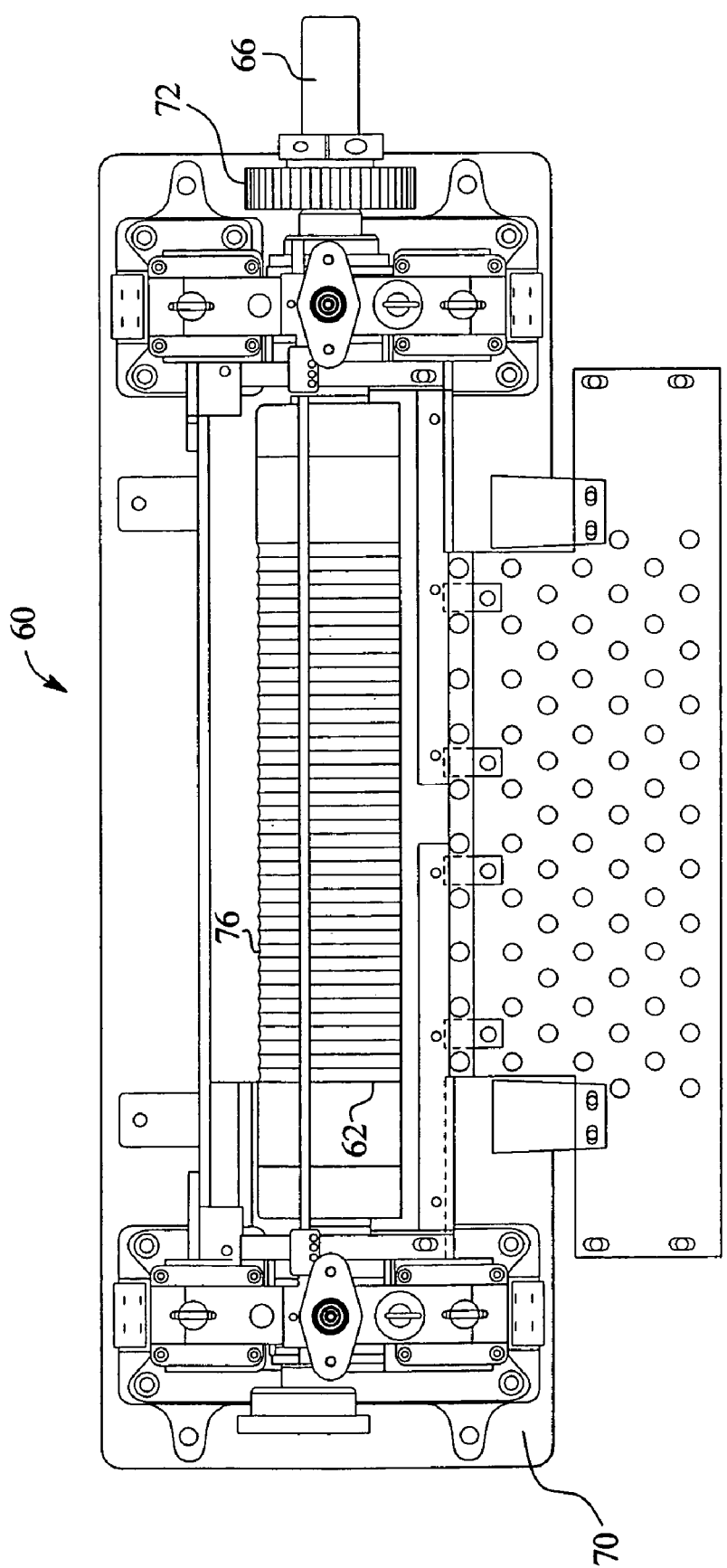

Referring now to FIGS. 5 and 6, front and top views of one embodiment of a preformer 60 are shown, respectively. Preformer 60 includes an upper roller 62 and a lower roller 64. Rollers 62 and 64 are coupled to shafts 66 and 68, respectively. Rollers 62 and 64, shafts 66 and 68 and accompanying apparatus are bolted and fixed to a base 70 of preforming roller 60. Rollers 62 and 64 are readily removed from shafts 66 and 68 to change the scoring of sheet 40 or for maintenance.

One of shafts 66 and 68 is a driven shaft. The driven shaft can be coupled directly or via a gear or timing belt to a motor or other type of motion producing device. The driven shaft is further alternatively coupled to the motor via a series of gears or via any other coupling mechanism known to those of skill in the art. The speed of the motor and thus the speed of the driven shaft is controllable so that the speed of the preforming rollers 62 and 64 matches or is in alignment with the speed of the translational motion of the feed conveyor feeding the continuous confectionary product sheet 38 into preforming machine 60.

In the illustrated embodiment, a gear 72 coupled to shaft 66 engages a gear 74 coupled to shaft 68. The driven roller 66 or 68 drives the non-driven roller 66 or 68 via the interface between gears 72 and 74. The mating relationship between gears 72 and 74 dictates that the shafts 66 and 68 and rollers 62 and 64 turn the same speed and in opposite directions at all times while running. In an embodiment, the rollers and shafts turn so that the tangential direction of the rollers 62 and 64 contacting the confectionary product sheet 38 is in the same direction as the feed direction of sheet 38. Rollers 62 and 64 pull or help to translate sheet 38 through the rollers.

Roller 62 defines grooves 76, while roller 64 defines mating grooves 78. Rollers 62 and 64 are set a distance $\Delta Z$ apart from one another as seen in FIG. 5. That distance $\Delta Z$ produces the scored sheet 40 having longitudinal crimps of a thickness $\Delta Z$ as seen in FIGS. 2D and 3. Sheet 38 is sized so that the entire sheet is scored all the way along its feed length or X-direction length to produce a continuous scored sheet having the Y-Z cross-sectional shape shown in FIG. 3.

Figure 7:
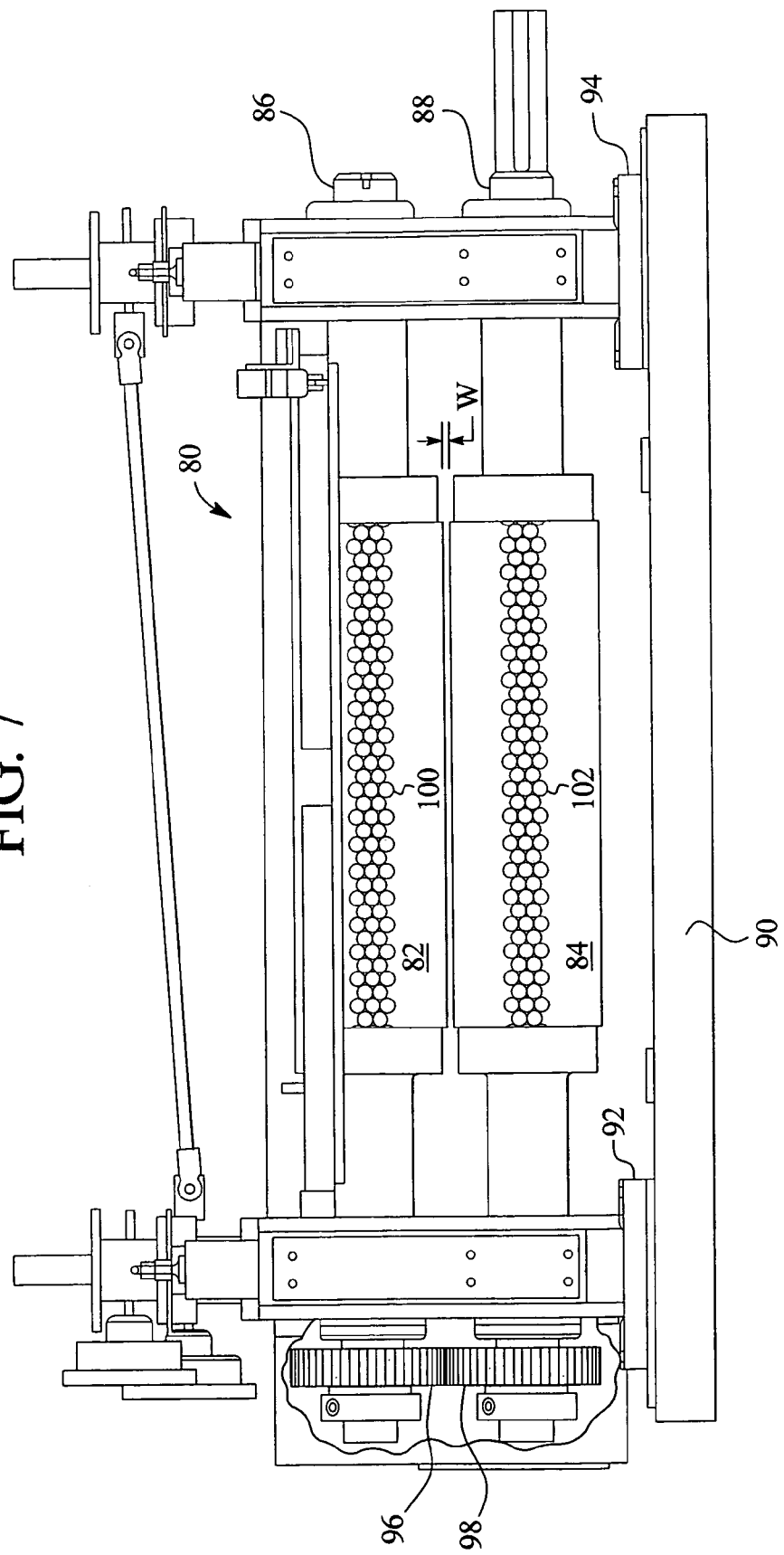
FIGS. 7 and 8 illustrate one embodiment of a product-forming forming machine of the present invention.
Figure 8:
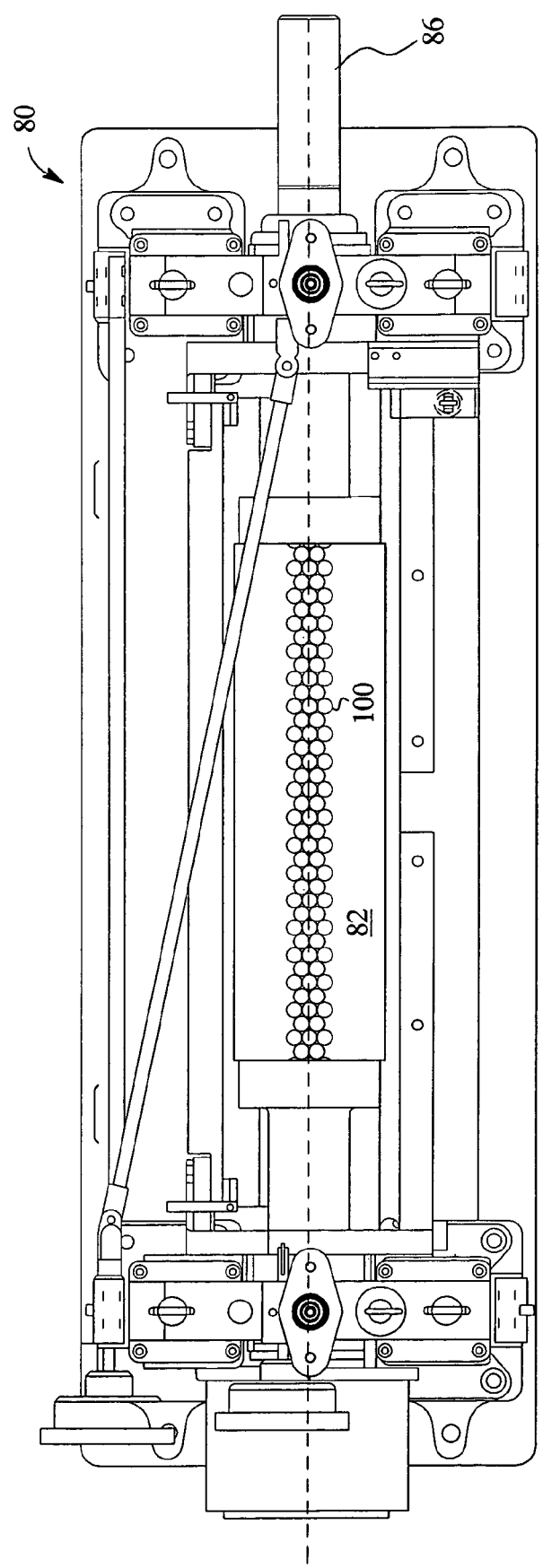

Referring now to FIGS. 7 and 8, an embodiment of the confectionary forming machine 80 is illustrated. Confectionary forming machine 80 has many of the same components as the preforming machine 60. In particular, confectionary forming machine 80 includes upper and lower rollers 82 and 84, respectively. Rollers 82 and 84 are coupled to shafts 86 and 88, respectively. Shafts 86 and 88 couple via bearings 92 and 94 to a base 90. As with preforming machine 60, one of the shafts 86 and 88 is a driven shaft. The shafts are coupled to gears 96 and 98, respectively. Gears 96 and 98 ensure that shafts 86 and 88 and rollers 82 and 84 turn at the same speed and in opposite directions at all times running.

As with preforming rollers 62 and 64, product-forming rollers 82 and 84 in one preferred embodiment turn so that the tangential direction of the rollers contacting the incoming scored sheet 40 is the same direction as the direction of feed of sheet 40. Rollers 62 and 64 pull or help to translate sheet 40 through the rollers. The driven roller is coupled to a speed-controlled motor. The speed of the motor is controlled so that the rotation of rollers 82 and 84 matches or is in alignment with the feed rate of scored sheet 40.

Figure 9:
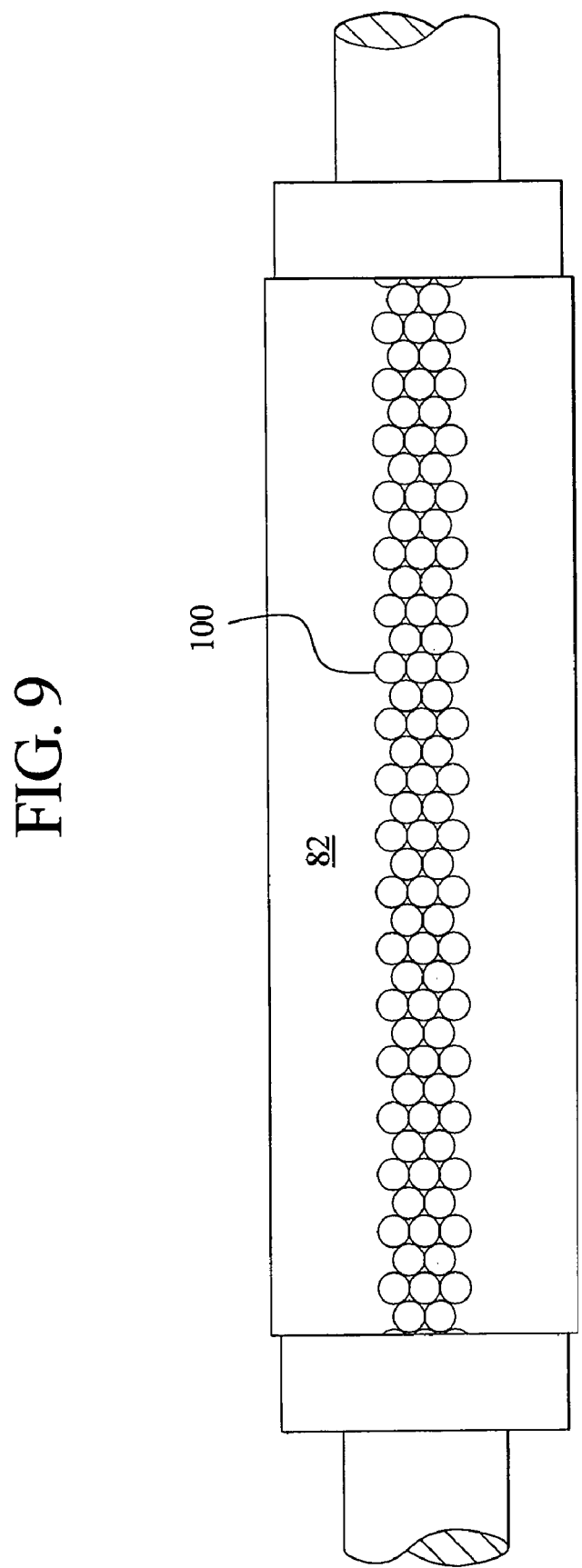
FIGS. 9 and 10 illustrate one of the rollers associated with the product-forming machine of FIGS. 7 and 8 in more detail.

FIGS. 7, 8 and 9 (FIG. 9 showing upper roller 82 in more detail) illustrate that the product-forming rollers 82 and 84 include or define a series of mating and interlocking pockets 100 and 102, respectively. As seen in FIGS. 7 to 9, shape defining pockets 100 and 102 each define hexagonal shapes. The hexagonal shapes 100 align with hexagonal shapes 102 as the rollers 82 and 84 spin. In that manner, hexagonal shapes 100 define an upper product portion or a portion analogous to portion 104 of the products 50 illustrated in FIGS. 4A and 4B. Hexagonal shapes 102 defined in scored sheet 40 lower product portions, shown analogously as portion 106 in FIGS. 4A and 4B.

The gap W shown in FIG. 8 defines the width of web 48 shown in FIG. 4A. Gap W is adjustable in one embodiment to be appropriate for the size and weight of the resulting products 50 and to adjust the width W of web 48 according to specified design parameters, product formulation and in accordance with environmental factors such as temperature and moisture. Regarding the formulation of the confectionery product, Gap W may need to be a certain width for a product that is less viscous or less brittle versus the product that is more viscous or more brittle.

It should be appreciated that the production rate of rolling apparatus 80 is a function of (i) the width of sheet 40, (ii) the feed rate of a conveyor conveying scored sheet 40 and (iii) the speed and diameter of rollers 82 and 84. Rollers 82 and 84 have a diameter that is sized to compromise between larger inertial loads created by larger diameter rollers versus more dramatic radii of the shape producing pockets 100 and 102 created by smaller diameter rollers. In one embodiment, products 50 along the edges of sheet 40 may need to be discarded if only a partial product is made or if the outer products become distorted.

Gap W can be made adjustable by replacing gears 96 and 98 coupled to rollers 82 and 84 with independently driven shafts 86 and 88. Two separate motors are used, one each to turn roller 82 and 84. Accordingly, one shaft and one roller may be adjusted relative to the other shaft and roller. Alternatively, gears 96 and 98 may be used, wherein one or more of shafts 86 and 88 is adjusted via other suitable mechanical devices, such as levers, pulleys, extension shafts, and the like.

Figure 10:
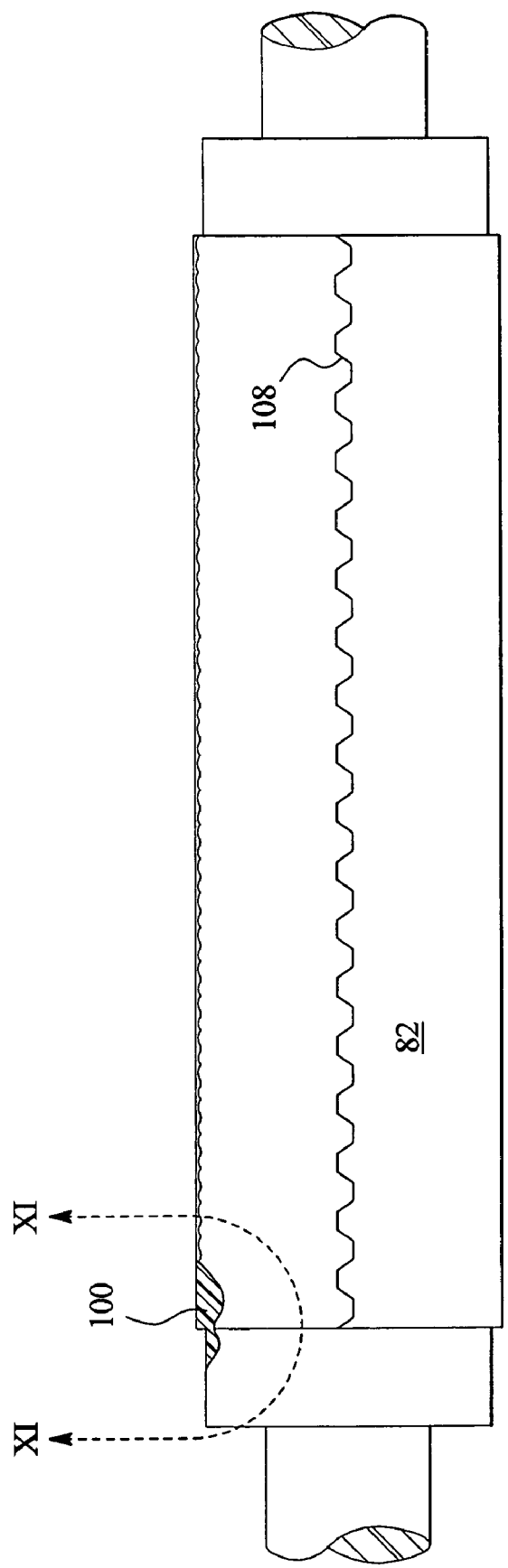

FIG. 9 illustrates a front view of upper shaft 82 as seen in FIG. 7, while FIG. 10 illustrates a plan view of upper shaft 82 as illustrated in FIG. 8. FIG. 10 illustrates that upper shaft 82 is equipped with a cutting knife 108. Cutting knife 108 separates scored sheet 40 into sheet sections 44*a* to 44*d* (separates formed sheet 44 into sections 44*a* to 44*d*). In the illustrated embodiment, knife 108 extends radially from roller 82 the gap distance W between rollers 82 and 84 and just mates with and contacts the mating hexagonal outer surface of certain pockets 102 of lower shaft 84. In an alternative embodiment, knife 108 is provided on lower shaft 84. In still a further alternative embodiment, each roller 82 and 84 includes a knife portion that extends part of the distance W and that mates with the knife portion of the opposing roller 82 or 84.

In one embodiment, knife 108 has a profile that follows the collective series of pocket shapes along upper and lower rollers 82 and 84. Knife 108 thereby reduces waste or scrap produced when separating the continuous scored sheet 40 (or formed sheet 44) into segmented sheet sections 44*a* to 44*d*. The reduction of scrap is also facilitated by the fact that the hexagonal shapes of pockets 100 and 102 are symmetrical and amenable to being stacked in directly adjacent staggered rows of the pockets. The hexagonal pockets 100 and 102 can be sized so that they are continuous along the entire operational length of the rollers 82 and 84 and the entire circumference of the rollers. It should be appreciated that other three dimensional shapes may not be as efficient in reducing the amount of product scrap and/or maximizing production space.

Figure 11:
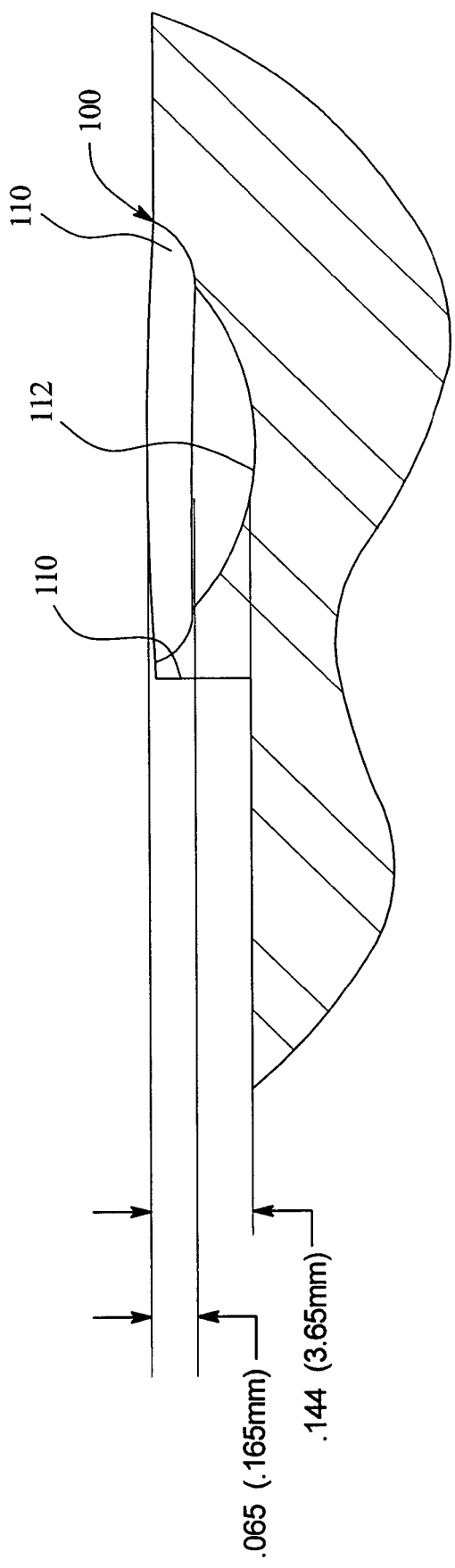
FIG. 11 illustrates in more detail one of the product-forming pockets of the roller illustrated in FIG. 10.

Referring now to FIG. 11, one embodiment for the product-forming pocket 100 of roller 82 is illustrated. In one embodiment, pockets 102 are the same as pockets 100. FIG. 11 is a section view taken along line XI-XI in FIG. 10. FIG. 11 illustrates a number of pertinent features of pockets 100. The features enable pockets 100 to create the desired product shapes, at least substantially, while reducing the likelihood that the confectionery products or sheets holding such products will stick to rollers 82 and 84. Indeed, the features illustrated in connection with FIG. 11 may reduce the need for the preformer 60, at least in some cases, the need for cooling the confectionary product or rollers and the need for rolling compounds, such as talc, maltitol or nubia oil.

As illustrated, pockets 100 are drafted so that outer portion 110 is tapered away from vertical to reduce the amount of friction applied by portion 110 of pocket 100 on the upper and lower portions 104 or 106 of product 50 as seen in FIGS. 4A and 4B. That is, a vertical pocket wall or a substantially vertical pocket wall tends to create a larger shear force on products 50 as the products release or attempt to pull away from rollers 82 and 84. By making the outer portions flared or more horizontal with respect to upper and lower portions 104 and 106 of products 50, the contact or friction force is lessened. The lessened contact force lowers the probability that sheet sections 44*a* to 44*d* will stick to one of the rollers 82 or 84. Indeed, the collective effect of providing drafted portions 110 on each of the pockets 100 is believed to provide a significant benefit to further the desirable non-sticking operation of the present invention.

FIG. 11 illustrates another pertinent feature of the pockets 100, namely, that the pockets define or include an air dome 112. Air dome 112 in the illustrated embodiment is a partial counter bore having a radius into the pocket (FIG. 11 provides sample dimensions, other suitable dimensions and shapes may alternatively be provided). The additional radius produces an amount of additional open space that is not filled with confectionary product. For a given pocket set 100/102, pockets 100 and 102 compress the confectionary products from the preformed shape illustrated in FIG. 3 only until the rollers 82 and 84 rotate into vertical alignment with each other. After that point, the pocket set 100/102 of rollers 82 and 84 pulls apart. The force of the rollers compresses the confectionary product a certain amount within pockets 100/102 (and potentially within a portion of dome 112) but not enough to fill dome 112 completely.

Air becomes trapped in the dome portion 112 of pocket 100. It is believed that the trapped air has a number of benefits. First, the air lessens the contacting surface area between the confectionery product and pockets 100 and 102 of rollers 82 or 84. Less confectionary product contacts the rollers due to the air pockets. Further, it is believed that the air trapped between the confectionary product and the dome portion 112 is slightly pressurized and tends to push the products 50 away from the pockets 110 as the pocket walls peel away from each other along the rotational path of the rollers. For at least those two reasons, air domes 112 further aid in producing a high volume, three-dimensional confectionary shaping production apparatus and method having reduced surface adhesion between the confectionary mass and the rollers.

It has been found that the force of the tumbling or separating apparatus 46 flattens roundness or bumpiness on the tops and bottoms of products 50 that may appear due to the air domes 112. Further, tumbling flattens or eliminates small amounts of additional product due to the drafting or flaring of the pockets 100/102 if it occurs. Accordingly, the benefits of the drafting 110 and air domes 112 outweigh potentially small amounts of product shape deformity, especially when provided in combination with a separating operation such as tumbling, which tends to smoothen and make the product shapes uniform.

The combined forces of rollers 82 and 84 and knife 108 have been found to, in certain circumstances, cause slight product deformation. For instance, it has been found that the sheet sections 44*a* to 44*d* tend to stretch or elongate in the feed direction. The elongation can be compensated for, however, in sizing the pockets 100 and 102 properly. FIG. 2G illustrates one example of how to compensate for elongation in the feed direction. Assuming that product 50 in FIG. 2G travels in the direction of the arrow, the X or feed dimension is sized at 0.551 inch (14 mm) to make product 50 have an ultimate dimension of 0.575 inches (14.6 mm), which is the desired X dimension length of product 50 in one implementation. The difference between the pocket sizing and the end product dimension is 0.24 inches (0.61 mm). The distance from side to side along the diagonal length of product 50 is sized to be 0.563 inches (14.3 mm) to eventually produce a product having the desired length of 0.575 inches (14.6 mm). The difference along the diagonal length is 0.12 inches (0.3 mm). The pocket is therefore compensated more in the dimension running parallel with the feed as opposed to the diagonal dimension having only an X or feed direction component. In one embodiment the dimension of the pocket along the Y-axis perpendicular to the feed is not changed because the product is not elongated in that direction.

Figure 12A:
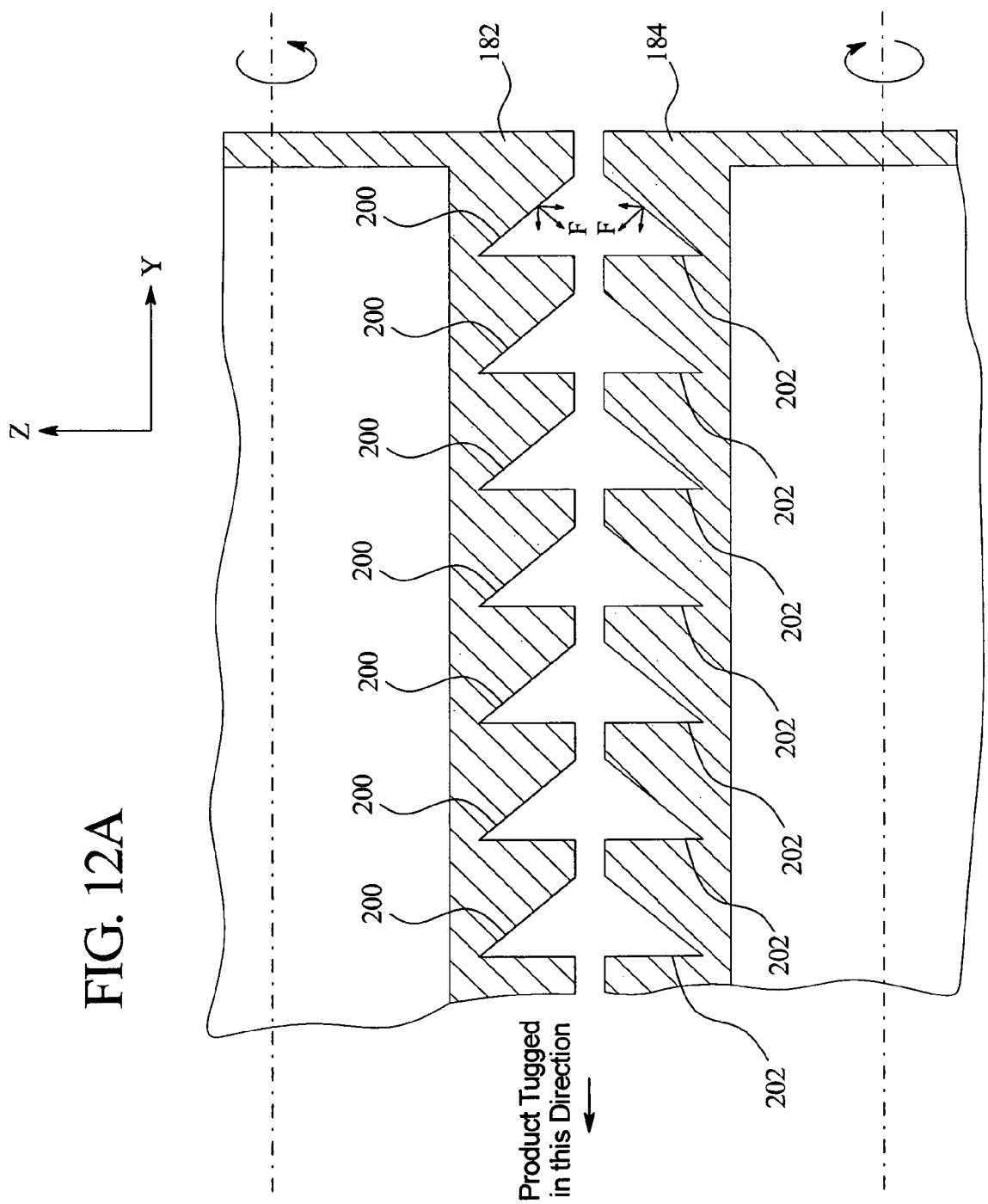
FIGS. 12A and 12B illustrate one problem and solution for such problem associated with the forces imparted by the confectionary product-shaping rollers of the confectionery products of the present invention.
Figure 12B:
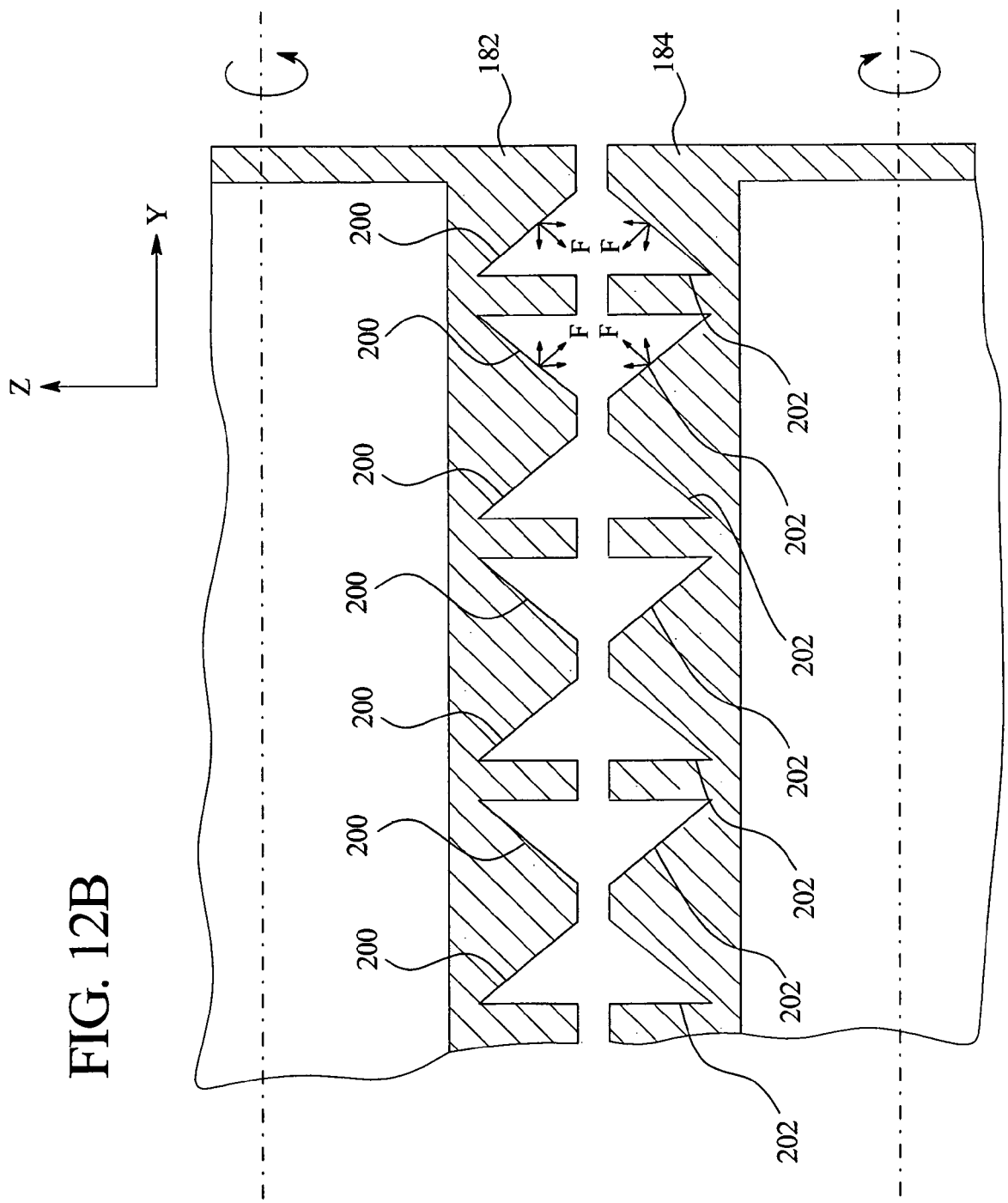

Referring now to FIGS. 12A and 12B, the inventors of the present invention have overcome another potential problem with the high production confectionary product-shaping rollers of the present invention. The potential problem is illustrated by the alternative rollers 182 and 184 in FIG. 12A. Instead of the symmetrical, hexagonal shape of pockets 100 and 102, the products formed by alternative pockets 200 and 202 form a conical shape, e.g., similar to a Christmas tree. Here, the diagonal faces of pockets 200 and 202 impart a force F onto the confectionery product. Force F is vectored perpendicularly to diagonal faces of pockets 200 and 202.

As seen, force F defined by pockets 200 as oriented in FIG. 12A has a negative Y component and a negative Z component. Force F defined by pocket 202 in FIG. 12A has a negative Y component and a positive Z component. The positive and negative Z components balance each other out so that the confectionery product sheet does not move substantially in the positive or negative Z direction while traveling through rollers 182 and 184. The negative Y components of the forces, however, accumulate via rollers 182 and 184 to provide a net overall force to the sheet 40/44 traveling through the rollers. The force will cause the product to tug in the direction highlighted by the arrow in FIG. 12A, namely, in the negative Y direction. The tugging can deform the ultimate shapes of products 50 and can lead to failure of the confectionary forming machine 80.

To compensate for the problem illustrated by alternative rollers 182 and 184, the rollers 182 and 184 in FIG. 12B produce the same shapes, but are configured so that the components of the forces F cancel each other out in all directions. Accordingly, the confectionery mass traveling through alternative rollers 182 and 184 of FIG. 12B is stable and produces the products 50 shaped as desired. As described above, one possible shape could be an egg, wherein the upper and lower rollers each define a longitudinal half of the egg. In that case, again, it is beneficial to configure the eggs in a mirrored formation as shown in FIG. 12B as opposed to an aligned formation as shown in FIG. 12A so that forces due to diagonal pocket surfaces cancel each other out. As shapes become more complex, contoured or faceted, determining the force vectors becomes more difficult than, for example, the conical shape of FIGS. 12A and 12B. In any case, mirroring the same complex shapes produces a net overall transverse force on sheet 40 of zero or substantially zero.

In certain instances, it may not be possible to simply place the non-symmetrical shapes in a mirrored format. In such cases, force pockets can be formed in the product rollers for the sole purpose of counterbalancing the forces. The force pockets are sized and shaped to impart the desired counter-acting force to yield the desired net zero translational force. The force pockets in one embodiment include shapes substantially similar to the shapes of pockets 200 and 202 in FIGS. 12A and 12B.

Chewing Gum Components

As discussed above, the present invention is expressly not limited to chewing gum, however, chewing gum is one type of confectionary product well suited for production via the apparatuses and methods of the present invention. To that end, a great variety of chewing gum compositions and formulations can be used pursuant to the present invention. Chewing gum generally consists of a water insoluble gum base, a water soluble portion, and flavor. The water soluble portion dissipates with a portion of the flavor of the gum over a period of time during chewing. The gum base portion is retained in the mouth throughout the chew.

The insoluble gum base generally comprises elastomers, resins, fats and oils, softeners and inorganic fillers. The gum base may or may not include wax. Typically, gum base comprises approximately 20 to about 40% of the gum product. However, because in the present invention such a high level of coating is used, the gum center is unusually small; otherwise the entire coating chewing gum piece would be too large for consumption. If a typical amount of gum base was used in the small gum center, it would result in an inadequate cud to masticate. Consequently, in the present invention, the base level is higher than normal. The insoluble gum base can constitute approximately 30% to about 90% by weight of the chewing gum, in an embodiment, the gum base comprises at least 50% of the chewing gum.

In an embodiment, the chewing gum base of the present invention contains about 20% to about 60% by weight synthetic elastomer, about 0% to about 30% by weight natural elastomer, about 5% to about 55% by weight elastomer plasticizer, about 4% to about 35% by weight filler, about 5% to about 35% by weight softener, and optional minor amounts (about 1% or less by weight) of miscellaneous ingredients such as colorants, antioxidants, etc.

Synthetic elastomers may include, but are not limited to, polyisobutylene with GPC weight average molecular weight of about 10,000 to about 95,000, isobutylene-isoprene copolymer (butyl elastomer), styrene-butadiene, copolymers having styrene-butadiene ratios of about 1:3 to about 3:1, polyvinyl acetate having GPC weight average molecular weight of about 2,000 to about 90,000, polyisoprene, polyethylene, vinyl acetate-vinyl laurate copolymer having vinyl laurate content of about 5% to about 50% by weight of the copolymer, and combinations thereof.

Preferred ranges for polyisobutylene are 50,000 to 80,000 GPC weight average molecular weight and for styrene-butadiene are 1:1 to 1:3 bound styrene-butadiene, for polyvinyl acetate are 10,000 to 65,000 GBC weight average molecular weight with the higher molecular weight polyvinyl acetates typically used in bubble gum base, and for vinyl acetate-vinyl laurate, vinyl laurate content of 10-45%.

Natural elastomers may include natural rubber such as smoked or liquid latex and guayule and natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters such as glycerol esters or partially hydrogenated rosin, glycerol esters of polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, high-intensity sweeteners, flavoring agents, softeners, emulsifiers, colors, acidulants, fillers, antioxidants, and other components that provide desired attributes.

Softeners are added to the chewing gum in order to optimize the chewability and mouth feel of the gum. The softeners, which are also known as plasticizers and plasticizing agents, generally constitute between approximately 0.5% to about 15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk sweeteners typically constitute about 5% to about 95% by weight of the chewing gum, more typically, about 20% to about 80% by weight, and more commonly, about 30% to about 60% by weight of the gum. Sugar sweeteners generally include saccharide-containing components commonly known in the chewing gum art, including but not limited to, sucrose, dextrose, maltose, dextrin, dried invert sugar, fructose, levulose, glactose, corn syrup solids, and the like, alone or in combination. Sugarless sweeteners include, but are not limited to, sugar alcohols such as sorbitol, mannitol, xylitol, hydrogenated starch hydrolysates, maltitol, and the like, alone or in combination.

High-intensity artificial sweeteners can also be used, alone or in combination, with the above. Preferred sweeteners include, but are not limited to, sucralose, aspartame, salts of acesulfame, altitame, saccharin and its salts, cyclamic acid and its salts, glycerrhizinate, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; Raftilose, Raftilin; Fructooligosaccharides (NutraFlora); Palatinose oligosaccharide; Guar Gum Hydrolysate (Sun Fiber); or indigestible dextrin (Fibersol). However, other low calorie bulking agents can be used.

A variety of flavoring agents can also be used, if desired. The flavor can be used in amounts of about 0.1 to about 15 weight percent of the gum, and preferably, about 0.2% to about 5% by weight. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

If desired, the chewing gum can include other ingredients such as active agents. These active agents can include medicaments. For example, the active agents can provide dental health benefits, breath freshening, and the treatment of diseases/disorders.

Formulations

By way of example, and not limitation, examples of the chewing gum formulations suitable for use in the present invention will now be given.

As noted above, the chewing gum base can include in an embodiment any one or more of the following components or derivatives thereof: elastomers, softeners, fillers and optional ingredients. The elastomers include, without limitation, any one or more of the materials or derivatives thereof listed below in Table 1. The elastomers are provided in an embodiment in an amount from forty to ninety percent. The softeners include, without limitation, any one or more of the materials or derivatives thereof listed below in Table 1. The softeners are provided in an embodiment in an amount from 0.1 to fifteen percent. The fillers include, without limitation, any one or more of the materials or derivatives thereof listed below in Table 1. The fillers are provided in an embodiment in an amount from 0.1 to fifty percent.

The chewing gum base can also include one or more optional ingredients. The optional ingredients include, without limitation, any one or more of the materials or derivatives thereof listed below in Table 1. The optional ingredients are provided in an embodiment in an amount from 0.1 to thirty percent.

TABLE 1

| Base | | | |
|---|---|---|---|
| Elastomers (40 to 90%) | Softeners (.1 to 15%) | Fillers (.1 to 50%) | Optional Ingredients (.1 to 30%) |
| polyvinyl acetate | glycerol triacetate | talc | petroleum waxes |
| Polyethylene | acetates of mono, di and triglycerides | calcium carbonate | resins |
| Polyisobutylene synthetic rubbers | | | vegetable oils |

Besides the base, which ranges in an embodiment from seventy to ninety-nine percent of the overall formulation, the chewing gum includes additional ingredients, such as any one or more or derivative of one or more of the following: flavorings, artificial sweeteners, natural sweeteners or other optional ingredients. The flavorings include, without limitation, any one or more of the types or derivatives thereof listed below in Table 2. The flavorings are provided in an embodiment in an amount from 0.5 to ten percent. The artificial sweeteners include, without limitation, any one or more of the materials or derivatives thereof listed below in Table 2. The artificial sweeteners are provided in an embodiment in an amount from 0.01 to five percent. The natural sweeteners include, without limitation, any one or more of the materials or derivatives thereof listed below in Table 2. The natural sweeteners are provided in an embodiment in an amount from 0.1 to fifty percent.

The additional ingredients can also include one or more optional ingredients. The optional ingredients include, without limitation, any one or more of the materials or derivatives thereof listed below in Table 2. The optional ingredients are provided in an embodiment in an amount from 0.1 to ten percent.

TABLE 2

| Additional Ingredients | | | |
|---|---|---|---|
| Flavorings (.5 to 10%) | Artificial Sweeteners (.01 to 5%) | Natural Sweeteners (.1 to 50%) | Optional Ingredients (.1 to 10%) |
| Liquid spray dried | Ace-K Sucralose APM | sucrose dextrose polyols | colorings fillers softeners |

The various end products described above can be coated or otherwise packaged for consumption. In an embodiment the chewing gum products are coated via conventional panning techniques to create unique, coated, ornamental or fanciful confectionery or chewing gum shapes. A bulk sweetener in the coating is in an embodiment very stable, highly water-soluble and is added easily to a panning solution. In an embodiment, bulk sweeteners such as dextrose, ribose, fructose, xylitol, maltitol, palatinit, and the like, may be combined with sucrose, other polyols, or used alone in solution to coat the chewing gum balls. In another embodiment, the bulk sweetener is also added as a powder that is blended with other powders used in certain types of panning procedures.

Conventional panning procedures generally use sucrose to coat the finished multi-faceted or fanciful chewing gum shapes. Recent advances in panning enable the coatings to include other carbohydrate materials, such as dextrose, maltose, xylitol, hydrogenated isomaltulose, other new polyols and combinations or derivatives thereof. These materials are blended with panning modifiers including chewing gum arabic, maltodextrins, corn syrup, gelatin, cellulose-type material like carboxymethyl cellulose, starch and modified starches, vegetable chewing gums like alginates, locust bean chewing gum, guar chewing gum and talc. In another embodiment, antitack agents are also added as panning modifiers, which allow a variety of carbohydrates and sugar alcohols to be used.

The present invention can include a hand coating procedure for the unique chewing gum shapes, such as that disclosed in U.S. Pat. No. 5,536,511, which is incorporated herein by reference. The coating can also include ingredients such as flavoring agents, artificial sweeteners, dispersing agents, coloring agents, film former and binding agents.

The coating formulation or coating procedure may be modified to meet the needs of a specific chewing gum type or shape discussed above. For example, the figurines may include different colors or the hollow straws may be striped. Hollow straw-like chewing gum can be provided on a spool where the chewing gum has a same or different color than the spool. A portion of a figurine may be hard coated, for example, a portion corresponding to a helmet or boot. The straws could be coated inside and out so that the straws actually function, at least for a period of time, to transport fluid before the straw is consumed eventually. The seam of the hollow straw can also be hidden via a hard coat.

In certain instances, it may be desirable to hard coat intricate or multi-sided shaped products to protect same during shipping or packaging. Moreover, any of the shapes described herein can be provided in combination with one or more medicaments, for example, to treat mouth or chewing gum disease. Further, any of the shapes described herein can be provided in combination with a liquid filled center. For example, the hollow straw can be liquid filled. In any of the foregoing cases, it my be desirable to hard coat the chewing gum shape so as to protect the medicament or liquid.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A confectionary product forming device comprising:
a first roller including first product-forming pockets;
a second roller including second product-forming pockets, the second product-forming pockets aligned with the first product-forming pockets;
at least one motion producing device coupled operably to the first and second rollers and operable to cause the first and second rollers to rotate and define in a confectionary mass fed into the rollers a plurality of three dimensional confectionary shapes caused by the first and second pockets; and
wherein the rollers are configured to have at least one adhesion reducing device that sufficiently reduces adhesion between the confectionary mass and the rollers so that neither the mass nor the rollers require cooling, the adhesion reducing device including air domes provided with the first and second pockets and shaped to trap air between the pockets and the three dimensional confectionary shapes in the pockets.

2. The confectionary product forming device of claim 1, which includes a third roller including first preforming structures and a fourth roller including second preforming structures, the second preforming structures aligned with the first preforming structures.

3. The confectionary product forming device of claim 2, wherein the third roller is spaced apart from the forth roller by a gap G, the gap G being larger than a gap W separating the first and second rollers.

4. The confectionary product forming device of claim 2, wherein the preforming structures are configured to preform at least one dimension of the three dimensional confectionary shapes.

5. The confectionary product forming device of claim 1, wherein the adhesion reducing device includes drafted edges provided along the first and second product-forming pockets.

6. The confectionary product forming device of claim 1, wherein the first product-forming pockets are (i) each of a same size and shape (ii) of different sizes (iii) of different shapes (iv) arranged in a mirrored formation (v) at least partly curvilinear or (vi) combination thereof.

7. The confectionary product forming device of claim 1, wherein the first and second product-forming pockets are both (i) of a same size and shape (ii) of different sizes (iii) of different shapes (iv) arranged in a mirrored formation (v) at least partly curvilinear or (vi) combination thereof.

8. The confectionary product forming device of claim 1, wherein the first and second product-forming pockets are positioned and arranged to apply at least a substantially net zero force to the confectionary mass in a direction transverse to a direction of travel of the mass.

9. The confectionary product forming device of claim 1, wherein the first and second rollers are linked via an apparatus selected from the group consisting of: mating gears and a timing belt.

10. The confectionary product forming device of claim 1, wherein the first and second rollers are adjustable with respect to each other to vary a distance between the rollers.

11. The confectionary product forming device of claim 10, wherein the motion producing device is a first motion producing device and which includes a second motion producing device operably coupled to the first and second rollers to vary the distance between the rollers.

12. The confectionary product forming device of claim 1, wherein the motion producing device is a first motion producing device and which includes a second motion producing device operable to feed the confectionary mass into the rollers.

13. The confectionary product forming device of claim 12, the first and second motion producing devices operable to feed the confectionery mass into the rollers at a predetermined rate ratio employed between the first and second motion producing devices.

14. The confectionary product forming device of claim 13, wherein one of the first and second motion producing devices is controllable to set a speed to follow speed fluctuations in the other of the first and second motion producing devices.

* * * * *